United States Patent [19]

McDonald et al.

[11] 4,027,145

[45] May 31, 1977

[54] ADVANCED CONTROL SYSTEM FOR POWER GENERATION

[75] Inventors: John Patrick McDonald, Holland; Harry G. Kwatny, Philadelphia, both of Pa.

[73] Assignee: John P. McDonald, Holland, Pa.

[22] Filed: Aug. 15, 1973

[21] Appl. No.: 388,544

[52] U.S. Cl. .............................. 235/151.21; 444/1; 235/151; 60/645; 290/40 R; 415/15

[51] Int. Cl.² .................. G06F 15/06; F01D 17/02; H02P 9/04

[58] Field of Search .......... 235/151.21, 151; 444/1; 60/39.28 R, 39.14, 105, 108 R, 108 S, 645, 646; 290/2, 40, 40.2, 40 R; 415/1, 15, 17

[56] References Cited

UNITED STATES PATENTS

| | | | |
|---|---|---|---|
| 3,288,160 | 11/1966 | Eggenberger et al. | 137/27 |
| 3,552,872 | 1/1971 | Giras et al. | 415/17 |
| 3,564,273 | 2/1971 | Cockrell | 415/17 X |
| 3,588,265 | 6/1971 | Berry | 415/17 X |
| 3,709,626 | 1/1973 | Eggenberger | 415/17 |
| 3,741,246 | 6/1973 | Braytenbah | 415/17 X |

*Primary Examiner*—Edward J. Wise
*Attorney, Agent, or Firm*—Paul & Paul

[57] ABSTRACT

Inplant sensors in the boiler and turbine units sense present values of a number of physical parameters designated process variables, and of certain control variables. Set points are developed, and deviations therefrom of the control and process variables are calculated. Utilizing a mathematical model, state variable deviations are estimated and translated into corresponding physical parameter estimates, which are used to evaluate model inaccuracy. State variable and model error estimates are translated into desired control deviations, which in turn are combined with fed forward values of the control variable set points. The combined control terms actuate controllers in the boiler and turbine units.

17 Claims, 5 Drawing Figures

ADVANCED CONTROL SYSTEM FOR POWER GENERATION

BACKGROUND OF THE INVENTION

This invention relates to the generation of electrical power. More particularly, it relates to integrated automatic control of electrical power generating stations.

Due to the extreme size, complexity, and expense of power generating equipment, effective operational control is an absolute necessity. The continuing increase in demand for electric power, unanticipated delays in provision for new generating capacity additions, the trend toward larger generating stations, and increased interconnection dependency among power companies are among the many factors which have magnified the importance of individual unit response capability to power system operating objectives. Not only are generating systems expected to provide a given demand with reasonable consistancy, but exceptional demands may also require rather rapid adaptation of output capacity to achieve a given megawatt demand. Realization of these goals, however, has been severely limited by the scope of available technology.

A typical power generating unit involves substantial mechanical complexity. A boiler unit, fed by water for steam and fuel and oxygen for heating, includes one or two separate furances and a complete water circulation system. The steam produced by the boiler is passed through one or more superheaters and thence to the throttle valves of a turbine governing stage. After being passed through a high pressure turbine, the steam can be reheated and passed again through a second turbine. All stages of this apparatus involve distinct physical characteristics. Moreover, at many points through the system, discrete controls afford an opportunity for changing one or more of those characteristics. Problems occur, however, because virtually all characteristics and controls throughout the cycle are interdependent upon one another, such that change of virtually any control parameter has physical effects at disparate points through the system. For example, in order to increase output production, a first step features opening a governing valve to the turbines. This, however, affects the pressure of steam in the superheaters (i.e., throttle pressure) and the level of water in the drum of the boiler (i.e., drum level). In order to keep throttle pressure up to a desired level, fuel valve positions in the boiler may be changed. This however, produces added heat to the drum, and the position of the feedwater valve to the boiler is subsequently manipulated. With the altered flow of water into the boiler, however, other factors are affected, and the cycle continues.

The very complex interaction of all these internal factors in generating units makes it difficult to realize rapid changes in megawatt output.

The preponderance of prior art systems tend to isolate several more or less distinct control aspects of a system, and to treat them on a strictly individual basis, For example, turbine throttle pressure has been linked rather directly to the position of the fuel valves to the boiler. Likewise, output power has been associated with the position of the governing valve of turbine. This segmented approach to control achieves a certain amount of stability in that, under a limited output demand, operational stability can be achieved. Nevertheless, the treatment of a complex, integrated system as a series of discrete subsystems is quite deficient in at least two respects. First, the subsystems approach requires some degree of approximation which ignores certain interactions. Secondly, lack of provision for interaction among the discrete subsystems renders it extremely difficult to meet changing generation demands.

In order to solve these difficulties, recent control systems have attempted to provide limited coordination between the discrete subsystems. First, use of variable set points for the discrete subsystem input quantites has been suggested. Also, a limited degree of coordination between power generation and throttle pressure subsystems has been shown. Finally, proposal has been made to add feed forward capabilities of input quantities to achieve further compensation facility. The former two additions have been applied to discrete subsystems, but the feed forward provision has generally been found to be impractical for the reason that calibration and set-up of the controls is both time consuming and expensive. Additional feed forward apparatus necessitates complete revision of well-accepted calibration techniques.

Sporadic attempts to integrate the control subsystems of power generating systems have thus far proven unsatisfactory. In fact, at least one expert has concluded that integrated control schemes would not in any event significantly improve the performance of the systems.

It is a primary object of the present invention to afford integrated optimal control which allows for complete consideration and interaction of all appropriate system parameters.

SUMMARY OF THE INVENTION

The present invention is a method for controlling power generating stations which integrates totally the interaction of all appropriate system parameters by utilization of the state variables which characterize the operation of any given system, even though they may not be physically measurable. State variable control theory involves the periodic measurement of certain physical parameters, and utilizing a mathematical model of prescribed form, the translations of the measurable physical parameters into the more useful state variables. Necessarily, however, the use of a mathematical model for translation from physical to state variables involves the introduction of error into the control process. In accordance with a primary feature, the present invention provides for evaluation and calculation of expected modeling error, and compensation therefor. Thus, antecedent to reconversion of the state variables back into physical quantities for regulation of the system, a compensation of physical parameters of the system is made for predicted inaccuracy in the mathematical model of the system. The corrected process parameters are then used in conjunction with state variables for conversion back to physically perceptible control parameters, which represent actual physical values of system control apparatus. That apparatus is therefore adjusted accordingly to yield the desired output power generating level.

In an illustrative embodiment of the present invention, output megawatt demand is translated by means of function generators into set of control variables which correspond to tentatively desired values of controllable items such as feedwater valve position in the boiler, fuel input valve position into the boiler, and orientation of the burners therein. Likewise, utilizing function generators, the megawatt demand is translated into set points for system process variables such as steam and water flow, boiler drum water level, excess oxygen in the boiler furnace, and other physically measurable aspects of the system. The difference between tentative control and process variable values and their present values are computed, and precedent to state variable calculation, the process variable differentials are adjusted to account for any effect which control variable differentials might have thereon. Next, the control variable differentials and the adjusted process variable differentials are coupled to apparatus which embodies a state observer. The quantities are thereby translated, utilizing state variable approach, into differentials of state variables. Rather than utilizing straight-forward conversion back from the state variable differentials into control variables, however, further provision is made to correct for anticipated modeling error in the state variable calculation. Thus, expected output differentials are evalutated, and the previously compensated process variable differentials are compared thereto. This comparator function allows the process variables to interact with the state variable differentials in order to produce control signals for the system. The combined state variable differentials and the process variable differentials, as corrected for expected error, are then converted to control variable differentials and, after combining them with the fed forward control variable quantities, new control signals are systhesized. These signals are coupled directly to the corresponding input controls of the system, and the desired megawatt output results.

It is a feature of the present invention, that, due to provision for correction for modeling error, a state variable control approach, previously of marginal practical utility, is rendered feasible for large, complex systems such as electrical power generating systems. Hence, in accordance with the principles of the present invention, the change which eventually must be imposed upon physical input parameters is integrally evaluated in terms of state variables on a real time basis. This in turn allows for the feature that many physical parameters of the system, such as impulse chamber temperature in the turbine governing stage, are rendered useful as a process variable, whereas it was unfeasible to do so in the prior art.

DETAILED DESCRIPTION

The principles of the present invention are disclosed in a thesis of J. P. McDonald entitled "Computer-Aided Design and Analysis of Multi-Variable Process Controls with Application to a Boiler-Turbine-Generator System", first published in Oct. of 1972. That thesis includes not only a detailed presentation of the apparatus and methods which embody the principles of the present invention, but it also sets forth exhaustive background and footnoting of the relevant prior art. Finally, it includes computer print-outs which provide a complete embodiment of the methods described hereinafter. An article entitled "Design and Analysis of Boiler-Turbine generator Controls Using Opitmal Linear Regulator Theory," by H. G. Kwatny and J. P. McDonald in the *IEEE Transactions on Automatic Control*, June 1975, Vol. AC-18, No. 3, at page 202, deals with the same subject matter. That paper was based on a similar disclosure delivered at the Aug. 16-18, 1972 Joint Automatic Control Conference. Both the thesis and article are incorporated by reference herein.

Figure 1:
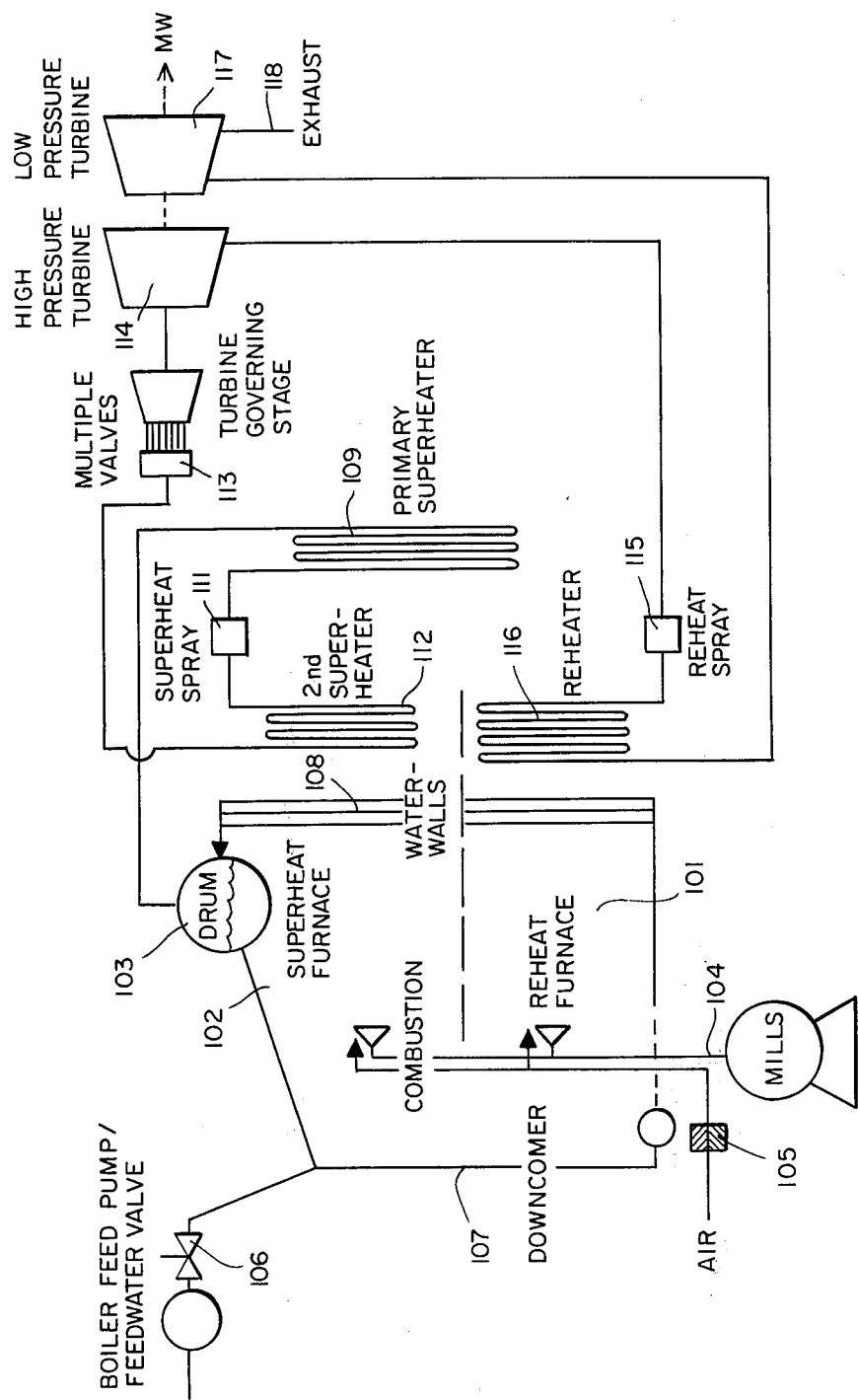
FIG. 1 shows a typical power generating unit schematic.

FIG. 1 shows in schematic form a combination boiler-generator unit which is amenable to application of the principles of the present invention. The unit shown in FIG. 1 is the Cromby No. 2 power generating unit. The FIG. 1 apparatus, the use of which is common by power companies, includes a double furnace in the boiler section, and a reheating stage subsequent to the application of steam to a first, high pressure, turbine.

The boiler section of the apparatus of FIG. 1 includes a reheat furnace 101, a superheat furnace 102, and a drum 103. Fuel, either in the form of crushed coal, oil, or the like, is conveyed separately to the reheat and superheat furnaces from a pair of input valves 104. Likewise, for combustion, air is coupled through input louvers 105 to both furnaces. Water for the entire system is coupled through an input feedwater valve 106 into a recycling circuit in the boiler including a downcomer stage 107, a series of water walls 108, and the drum 103. The amount of heat applied to the water walls 108 and drum 103 from both the superheat and reheat furnaces 101 and 102 is regulated in accordance with a variable designated herein as "tilt". Physically, the "tilt" variable refers to the angle of the burners from which heat is conveyed relative to the water walls 108 of the furnaces. Heated water from the water walls 108 passes into the drum 103 and is subsequently further heated in the superheater 109. In order to achieve a finer control over the heat of the steam prior to application to the turbine stage, steam passes through a spray 111 where a small amount of water is inserted into the superheated steam. Thereupon, the cooler superheated steam is passed to a second superheater 112 where it is further heated, and thence passed to a set of multiple governing valves 113 of the turbine unit. At this stage, steam is to be passed onto the turbine blades; the position of the governing valves 113 regulates the amount of steam which passes into the turbine.

From the governing valves 113, the steam passes through the governing stage and over the blades of the high pressure turbine 114 and out to a second spray unit 115. Due to the exhaustion of energy in the turbine 114, and to the further cooling from a spray 115, the energy of the steam is within rather well defined limits. In order to reuse this steam for further driving of the turbine, it is passed through another heating coil 116 wherein heat is drawn from the reheat furnace 101. Thereby conditioned, the reheated steam (which is characterized herein by a "reheat temperature") is passed onto the blades of low pressure turbine 117. Thereupon, the energy of the steam is for all practical purposes expended, and so it is expelled at an exhaust 118. The output megawatt generation of the unit is, of course, established by the turning of the high pressure turbine 114 and the low pressure turbine 117.

In the embodiment of FIG. 1, several distinct, physically measurable parameters may be identified. First, in the boiler stage, the water level in the drum 103, the feed water flow from valve 106, and the main steam flow into the governing valves 113 are readily measurable, as is air flow and excess oxygen in each furnace. Due to physical limitations, the fuel intake to the reheat and superheat furnaces 101 and 102 is not readily susceptible to physical measurement. The temperature and pressure of steam as it passes from the superheater 112 and the temperature of the steam from the reheater 116, and the present megawatt output are useful and readily measurable.

Just as several useful, physically measurable terms of the apparatus of FIG. 1 were susceptible to clear delineation, a set of input parameters which are subject to physical manipulation may be noted. For practical purposes, the operation in the boiler unit may be effectively controlled by the position of the feedwater valve 106, the status of the air input louvers 105, the independently adjustable tilts of the burners in the superheat furnace 102 and the reheat furnace 101, and the oil (or coal) input valve positions 104 to the furnaces 101 and 102. In the power generating stage, the amounts of water inserted at the sprays 111 and 115 may be regulated. The extent of opening or closure of the governing valves 113 of the turbine stage are important and a powerful means of control.

In the physical operation of the apparatus of FIG. 1, there exists a substantial amount of interaction between the respective measurable physical parameters of the system hereinafter designated process variables, and the various input parameters, designated control variables, which control the process variables. In fact, it is this extensive interaction which brings about the many problems experienced in the prior art, but which the principles of the present invention utilize to advantage. For instance, if there occurs a change in the requisite megawatt output of the turbine stages, the most direct method of control is to correct the position of the governing valves 113 of the turbine governing stage. Operation of these valves, however, tends to have an effect on the steam flow through the primary superheater 109 and secondary superheater 112, and consequently changes the water level in the drum 103. This in turn has an effect on the water which circulates in the boiler, and must accordingly be compensated for. Otherwise, the steam pressure and temperature at the turbine governing stage will be adversely affected. For these purposes, at least two actions are available. First, the feedwater valve 106 may be adjusted in order to change the amount of water circulating in the boiler. Also, the amount of fuel supplied to the furnaces 101 and 102 may be changed. Both have substantial effect on the results achieved by the other. Similarly, alteration of the burner tilts in the furnace 101 and 102 would have a substantial effect on the temperature of the water and steam throughout the system, and likewise on the steam pressure at the turbine governing stage. Compounding the problem still further is the fact that compensation for megawatt demand in its most direct forms has indirect effects on the throttle pressure, which in turn feeds back and affects the power generation output in the turbine units. Alteration of any of the input parameters has the tendency to degrade the intended effect of others.

In summary, power generation units (such as the one shown symbolically in FIG. 1, and also including single furnace units which present substantially the same control problems in somewhat abbreviated form) are characterized by a plethora of interrelated measurable physical parameters which may be affected in diverse ways by a similarly large number of physical input parameters. It should be noted that, although many of these parameters are identified herein, many others might similarly be identified. While none of the prior art systems have been able to use such other physical and input parameters of the units, any of the parameters may be advantageously provided for in accordance with the principles of the present invention.

Figure 2:
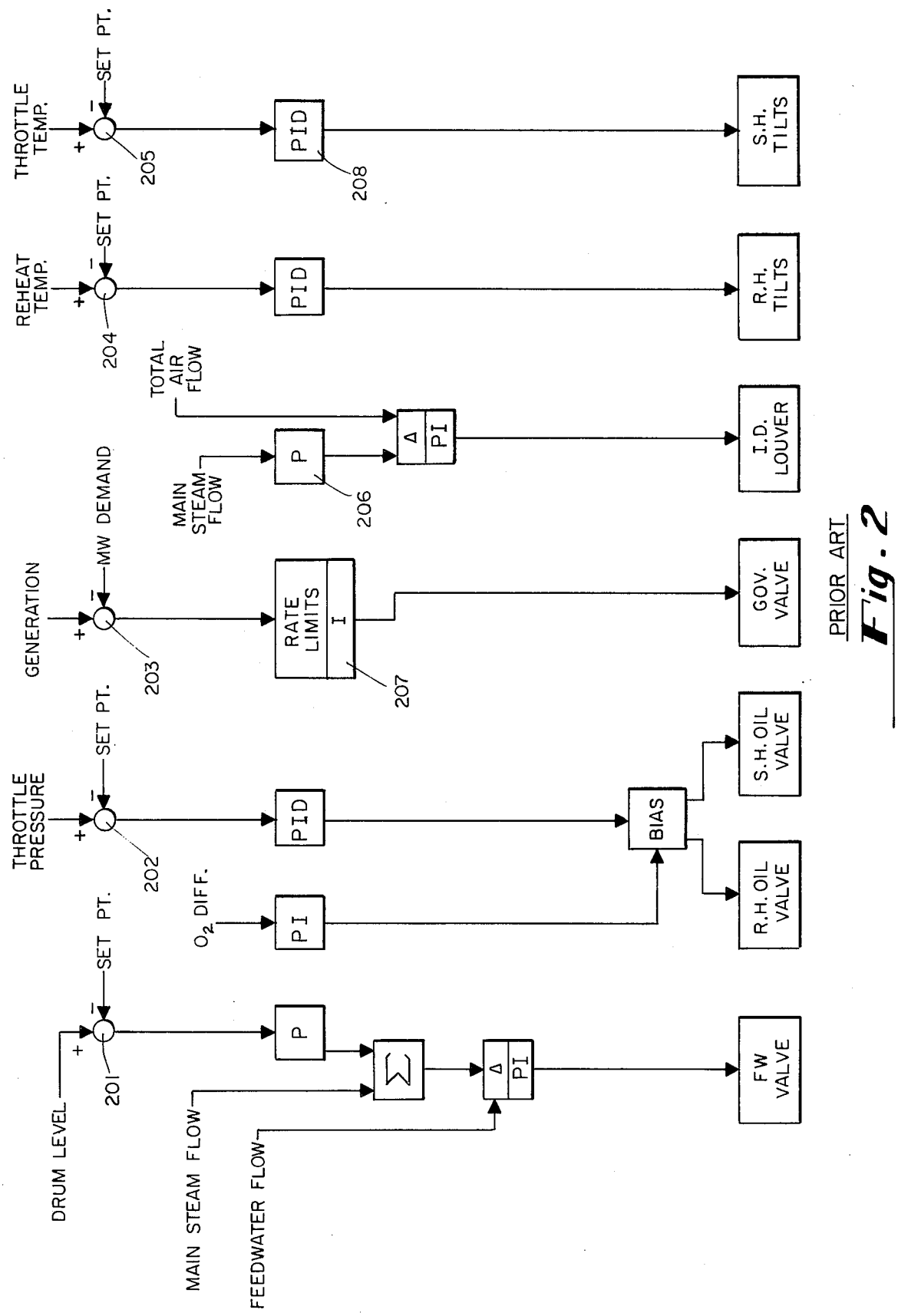
FIGS. 2 and 3 show prior art control methods.

The basic prior art approach to achieving controls of systems such as that shown in FIG. 1 is illustrated symbolically in FIG. 2, which shows six separate control functions, each of which is totally isolated from the other. In accordance with the prior art methods illustrated in FIG. 2, the foregoing measurable physical parameters of this system are isolated, and each is identified with one or more basic input parameter which has the most effect thereon. For example, control of reheat temperature at coil 116 is made solely a function of the burner tilts of the reheat furnace 101. Other physical parameters of this system are identified with single input parameters as shown. The basic strategy involved in the prior art methods of FIG. 2 is to determine empirically a group of set points at which the system works to yield a desired output. These set points are subtracted from the present measured values at a series of combination circuits 201 through 205 to evaluate present deviation from the norm. Thereupon, this differential is simply translated into a control quantity for a corresponding input parameter. As shown in FIG. 2, this processing is illustrated by the following terminology. A box with P therein, such as block 206, indicates that the input quantity is multiplied by a scalar factor, and an I within a box such as block 208 indicates an integration process and D indicates a differentiation process. In practice, the various multiplication, integration, and differentiation constants are obtained by an initial tuning process for the unit.

In summary, FIG. 2 illustrates the basic prior art approach to power generation control, which approach features isolation of the several measurable physical parameters of the system with corresponding input parameters. Once levels are established for each of the physical parameters, the entire unit is tuned by adjusting the P, I, and D factors to achieve stable operation. A more detailed presentation of the prior art approach of FIG. 2 is set forth in the above described thesis and article which are incorporated by reference herein.

The principle characteristic of the prior art approach is its disjoint processing of the physical parameters of the system, and its chief drawbacks are directly caused thereby. For example, as described hereinbefore, the generation and throttle pressure control loops to a certain extent operate adversely to one another, with the result that adjustment of one in order to achieve stability tends to pull the other one away from a stable situation. Likewise, the control approach illustrated by FIG. 2 is utterly devoid of flexibility to account for very realistic physical situations, such as rapid changes in megawatt output demand.

Figure 3:
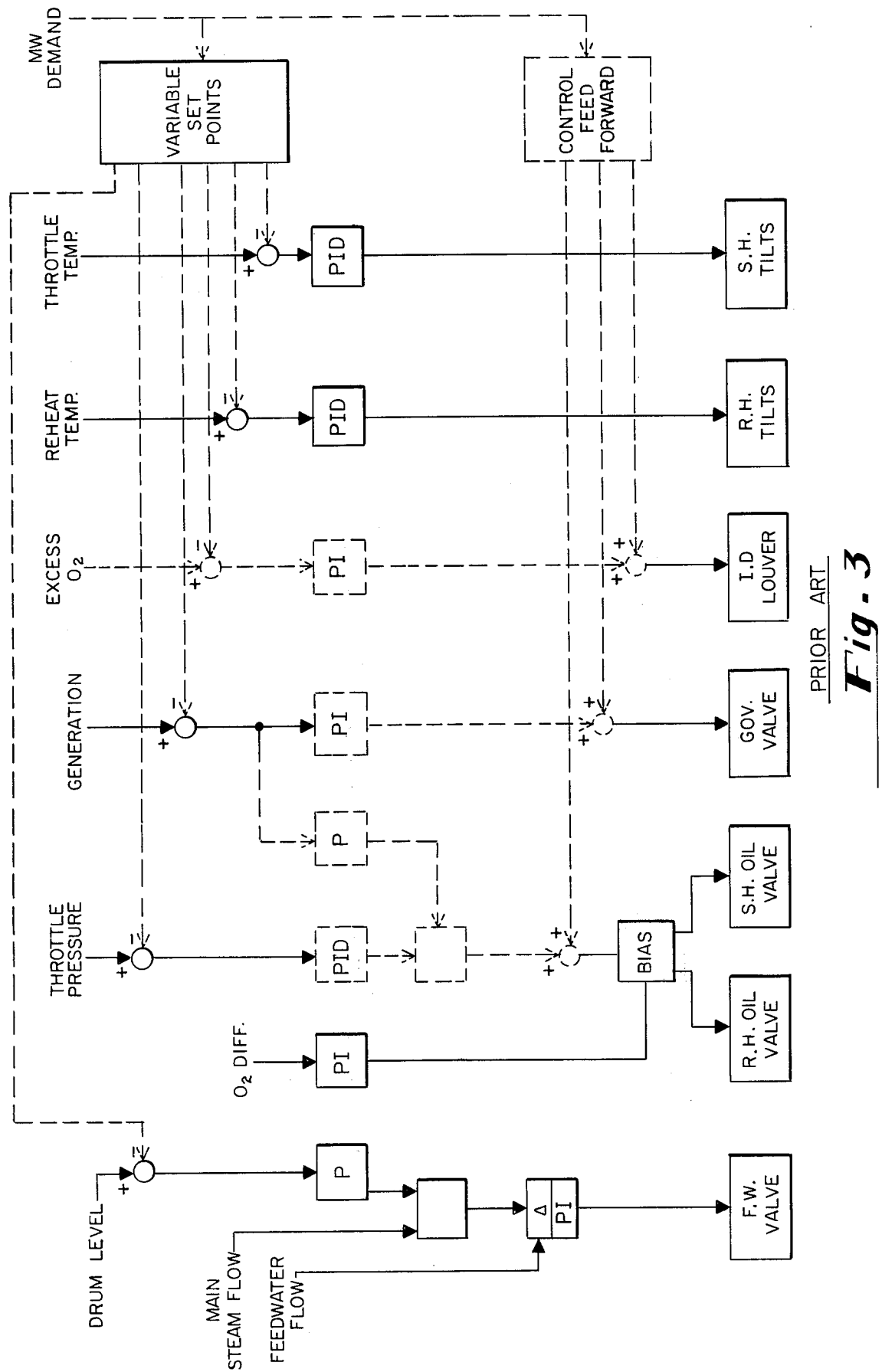

In response to the operational deficiencies of the FIG. 2 procedures, a few improvements have been attempted. These attempts are set forth in FIG. 3. In particular, FIG. 3 represents a system very similar to that of FIG. 2, with improvements being shown in terms of dotted lines. Three principle improvements are incorporated in FIG. 3. First, provision is made for variable set points. Accordingly, in response to changing megawatt demand, each of the various set points corresponding to the drum level, throttle pressure, power generation, reheat temperature, and throttle temperature may be altered. This affords some degree of flexibility over the rigidly structured set points of the FIG. 2 method. Improved measurement technology also permits excess oxygen measurement whch can replace air flow as a controlled variable.

The second major improvement shown in FIG. 3 is an interaction between the power generation and throttle pressure control systems. This interaction reduces the parasitic effect which those control loops normally have on one another, but due to its simplicity and rigidity, this improvement still is inadequate to achieve adequate control.

The third improvement illustrated in FIG. 3 is provision for a control feed forward adjustment in the throttle pressure, power generation, and oxygen control loops. In response to changed megawatt demand, a feed forward procedure such as the one shown theoretically allows for a more rapid adjustment of critical factors in order to achieve the desired output power. While theoretically advantageous, the control feed forward provision has been seldom used, since it should entail resetting of the scaler multiplication factors on a continuous basis. As pointed out hereinbefore, the tuning process to achieve the proper amplitudes for the scaler p factors is both difficult and time consuming. Effectively, therefore, the feed forward improvement shown in FIG. 3 is relatively unavailable for power generating systems such as the one shown in FIG. 1.

Utilization of the principles of the present invention is grounded upon the concepts of state space and state variables. The state vector of a dynamic system has been defined as the smallest collection of factors which must be specified at some time T in order to predict uniquely the behavior of the system for any time after time T for any input belonging to a given input set, provided that every element of the input set is known for all time after time T. Such factors are called state variables, and the input set constitutes all possible inputs which can be applied to the system. The state variable concept may therefore be summarized as the identification of a minimal set of variables which characterize the behavior of a given system. These variables may or may not be physically measureable in terms of the system apparatus, and in fact may have no physical analogs at all.

Generally, a system may be dealt with in accordance with the state space approach by characterizing it in equations of the following form:

$$dX/dt = AX + BU \tag{1}$$

$$Y = CX + DU \tag{2}$$

wherein "$X$" is the n-dimensional state vector, $U$ is a p-dimensional vector which represents input parameters to the system (i.e., the control variables), $Y$ is a m-dimensional vector which includes measurable physical parameters of the system (i.e. process variables), and $A$, $B$, $C$, and $D$ are matrices of proper dimension which characterize the physical system in question. The task of controlling a system in accordance with the state space approach therefore first involves modeling a given system such that it conforms to the state variable format described by equations 1 and 2. Thus, once the system is chracterized in terms of the A, B, C, and D matrices, and the variables are identified which constitute the X, Y and U vectors, the operation may be translated from physical space into state space.

An exhaustive treatment of state variables is presented in *State Variables for Engineers*, by DeRusso, Roy, and Close, New York: John Wiley and Sons, 1965.

A principal feature of the state space approach is that the control and analysis processes can be carried out in a convenient mathematical shorthand. Accordingly, once a given system is modeled, fully coordinated, dynamic control can be designed through use of the state vector, whereas such control is impracticable utilizing the physical variables directly. Use of an artificial process such as the state space approach is not without it drawbacks, however, since the quality of control achieved will only be as accurate as is the physical model utilized. In other words, since the use of state variables is contingent upon a characterization of a given system in the form of equations 1 and 2, the effectiveness of such application is limited by the accuracy of synthesis of the A, B, C, and D matrices to correspond physically to the system being controlled. In fact, in the prior art, this modeling accuracy hurdle was deemed to be practically insurmountable for systems such as the one shown in FIG. 1, which involve such physical and functional complexity. Thus, although the FIG. 1 generating unit has been characterized for state variable control, no modeling characterization has been sufficiently accurate for practical utility. As set forth hereinbefore, the principles of the present invention obviate this difficulty by making dynamic correction for the modeling error. With incorporation of this compensation process, the state variable approach is rendered amenable to large, complex systems such as the one shown in FIG. 1, and the theoretical beneficial results of the state variable approach are rendered realistic and attainable.

The following embodiment features the application of the state space approach, incorporating the principles of the present invention, to the Cromby unit shown schematically in FIG. 1. The state space model for that system, represented by the A, B, C, and D matrices of equations 1 and 2, is the one outlined in the foregoing thesis of J. P. McDonald, and which also is described in a paper presented to the 1971 Joint Automatic Controls Conference, entitled "A Non-Linear Model for Reheat Boiler Turbine Generator Systems" by H. G. Kwatny, J. P. McDonald, and J. H. Spare. Coincidentally, that model utilizes as input and controlled variables the identical ones which were featured hereinbefore in the discussion of prior art approaches to power generation control. It should be emphasized, however, that the principles of the present invention are by no means limited to correction for modeling error in accordance with these particular variables. Rather, it is a feature of the present invention that any input and controlled variables may be utilized, including certain variables which were not amenable to use with the above-described prior art methods. One such example is the impulse chamber temperature which characterizes certain aspects of operation at the turbine governing stage. Although it has been recognized that this temperature has substantial effect on the turbine life, its inherent characteristics precluded isolation for physical control of the system. Since, with the application of the principles of the present invention, the state space control method is rendered available, there is no longer any requirement that the input and controlled variables be limited as in prior art.

Figure 4A:
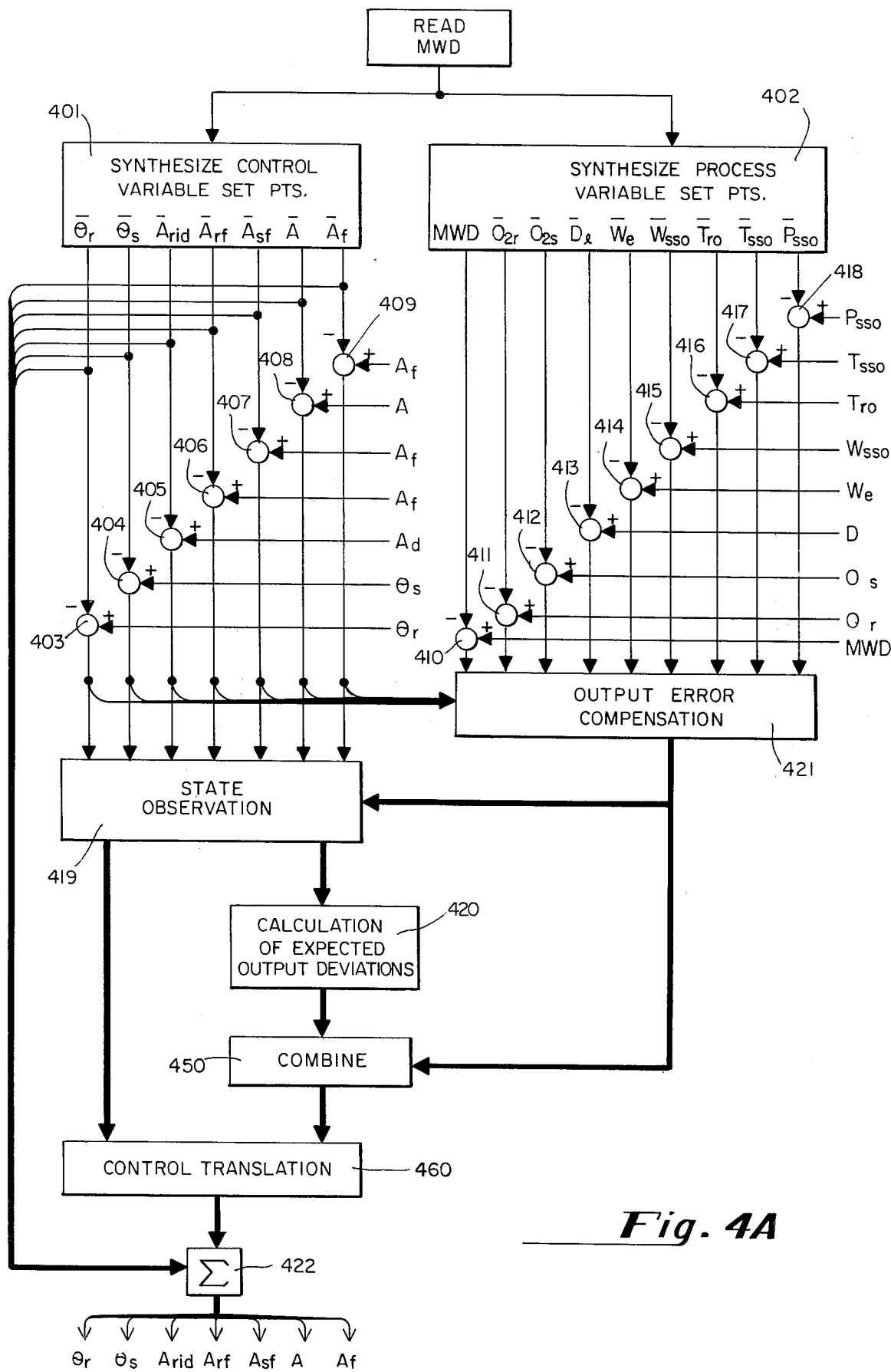
FIGS. 4a and 4b show control methods which embody the principles of the present invention.
Figure 4B:
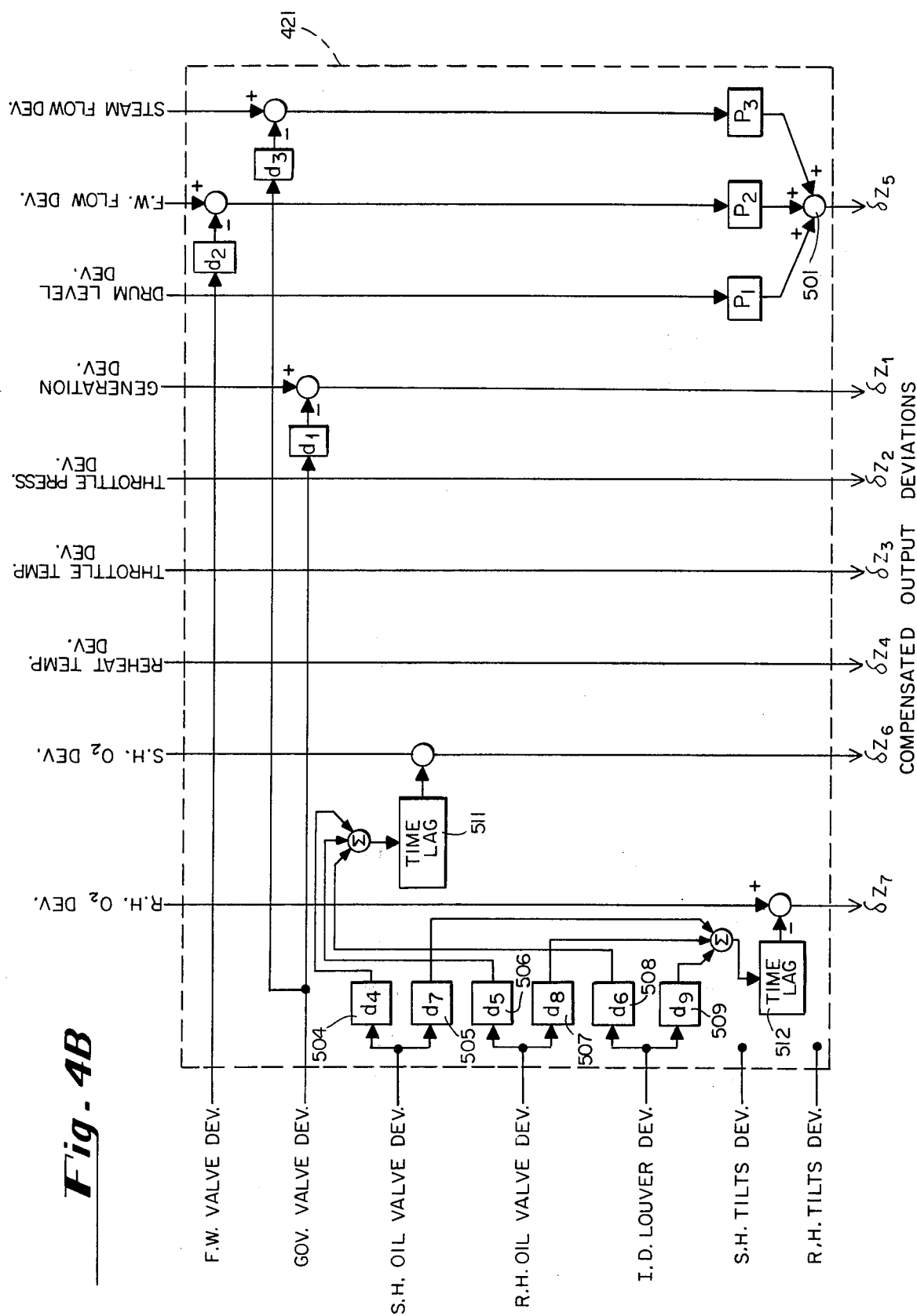

As illustrative embodiment of the principles of the present invention is shown in block diagrammatic form in FIGS. 4a and 4b. Each process step in FIGS. 4a and 4b may be embodied as hard-wired Analog Devices designed only to conduct the particular step in question, or alternatively as a properly programmed multi-purpose digital computer which is conditioned to perform the desired mathematical steps. In this regard, it should be noted that the principles of the present invention do not reside particularly in the mathematical steps in and of themselves, but rather in the application of those steps on a real time basis to control a physical system, with physical input data being taken from that system, the method embodying the principles of the present invention being executed, and physical control information being conveyed back to the system in question.

In FIG. 4a, a megawatt demand signal is identified, on the basis of which the system operation is to be controlled. Responsively to this megawatt demand, a series of set points is formulated utilizing function generators of predetermined form. As shown, two separate sets of variable set points are synthesized, a first set being designated "control variables" and a second set being designated "process variables". As utilized herein, the "process variables" represent physically measurable parameters which may be observed and which relate directly to the present operation performance of the system. Thus, the process variables of FIG. 4a represent the Y vector of equations 1 and 2. The term control variable is utilized herein to represent various input parameters to the system by means of which system operation may be altered as desired. Control variables therefore correspond to the U vector of equations 1 and 2. In FIGS. 4a and 4b, the control vector U is made up of control variables which include: the feedwater valve position, designated $A_f$; the governing valve position, designated A; the superheat oil valve position, designated $A_{sf}$; the reheat oil valve position, designated $A_{rf}$; the superheat and reheat furnace input oxygen louver set points, designated $A_{sid}$, and $A_{rid}$, respectively (hereinafter these latter two variables shall be assumed always to be equal); the superheat furnace burner tilt, designated $\theta_s$; and the reheat furnace burner tilt, designated $\theta_r$. The process variables utilized by the embodiment of FIG. 4a and 4b include: the present power generation, designated herein as MW; the throttle pressure, designated $P_{sso}$; the throttle temperature, designated $T_{sso}$; the reheat outlet temperature, designated $T_{ro}$; the throttle flow, designated $W_{sso}$; the feedwater flow, designated $W_e$; the drum water level, designated $D_1$; the superheat furnace excess oxygen, designated $O_{2s}$; and the reheat furnace excess oxygen, designated $O_{2r}$. While these nine process variables provide adequate basis for control in accordance with the principles of the present invention, many others may readily occur to those skilled in the art, and be readily applicable thereto. The synthesis of control variable and process variable set points at steps 401 and 402 in response to the present megawatt demand, are conducted in accordance with the desired steady state operating profile. For example, the set points may be perpetually constant values, or may be representative of elaborate non-linear functions. In either case, the set points as developed are all coupled to a series of combination steps 403 to 418. Coupled to the positive input of combination steps 403 to 409 are the present values of the control variables, including feedwater position, governing valve position, etc. Likewise, coupled to the positive input of combination steps 410 through 418 are the present measured values of the process variables including steam flow, feedwater flow, drum level, etc. Each of the respective combinations therefore develop a differential, or deviation, between the present value and the set point value of each of the variables. More particularly, the control variable deviations from combination steps 403 and 409 together are coupled to a state observer 419, which accomplishes a translation from the physical domain into the state space. Among other things, the design of the state observer 419 involves the model of the generating unit of FIG. 1 in terms of the state space format as presented in the foregoing paper of Kwatny, McDonald, and Spare. The process variable deviations constitute the Y vector and the control variable deviations constitute the U vector.

Prior to utilization of the process variable deviations, it is useful to compensate their values to account for the control variable deviations. This compensation, which is represented at block 421, is conducted in order to obviate overreaction between the control variable deviations and the process variable deviations. In other words, a large value for a given one of the process variable deviations might otherwise indicate that substantial variation thereof is called for. Simultaneously, however, the present value of one or more corresponding control variable deviations might indicate that the associated process variable deviation should be altered less than its amplitude otherwise would indicate.

An illustrative embodiment of the compensation afforded at block 421 is shown in detail in FIG. 4b. The control variable deviations, representing feedwater valve position, governing valve position, etc. in terms of deviation from the generated set point, are coupled to compensation step 421 on the left hand side of FIG. 4b. The process variable deviations are likewise coupled to compensation step 421 from the top of FIG. 4b. The compensation afforded by the apparatus of FIG. 4b may be detailed as follows. Generally, reheat temperature, throttle temperature, and throttle pressure need not be compensated, and those deviations are passed directly through compensation step 421. Likewise, superheat and reheat tilts afford little utility from the standpoint of compensation, and they are therefore unused by compensation step 421. Since the drum water level, the feedwater flow, and the steam flow, all boiler quantities, are affected directly by the position of the feedwater valve and of the governing valve, a corresponding linear compensation is afforded in FIG. 4b. For illustrative purposes these compensated values are weighted and combined at combination means 501 to render the operation analogous to the prior art handling of the same factors. In accordance with the principles of the present invention, the three variables could as well be processed separately. The more complex compensations provided in FIG. 4b involve the introduction of excess reheat and superheat oxygen factors, which in turn reflect combustion conditions in the reheat and superheat furnaces. These quantities are affected by the positions of the superheat oil valve, the reheat oil valve, and input louver to the burner. Compensation is accordingly afforded in FIG. 4b, by means of the linear multiplication steps 504 and through 509. In FIG. 4b, two time lag functions 511 and 512 are supplied antecedent to the combination. These time lags are provided because the corresponding valve and louver positions are instantaneous functions subject to rapid change, whereas the measurement of the reheat and superheat excess oxygen levels are rather slow reacting. In FIG. 4b, each of the scaler multipliers which provide the compensation are designated individually. These scalar factors are determined in the design process as described in the thesis by J. P. McDonald and the article by J. P. McDonald and H. G. Kwatny.

At the output of the compensation circuit 421, the various process variable deviations may be represented mathematically by the following set of equations:

$$\delta z_1 = mw - mwd - (d_1)(A - \bar{A}) \quad (3)$$

$$\delta z_2 = Psso - \bar{Psso} \quad (4)$$

$$\delta z_3 = Tsso - \bar{Tsso} \quad (5)$$

$$\delta z_4 = Tro - \bar{Tro} \quad (6)$$

$$\delta z_5 = (P_1)(Wsso - \bar{Wsso} - (d_2)(A - \bar{A}))(P_2)(W_e - \bar{W}_e - (d_3)(a_f - \bar{A}_f))(P_3)(D_1 - \bar{D}_1) \quad (7)$$

$$\delta z_6 = O_2 s - \bar{O}_{2s} - \int L_1 \, dt$$

where $$L_1 = 1/\tau_2 \{(d_4)(A_{sf} - \bar{A}_{sf}) + (d_5)(A_{rf} - \bar{A}_{rf}) + (d_6)(A_{std} - \bar{A}_{std}) - (O_{2s} - \bar{O}_{2s})\} \quad (8)$$

$$\delta z_7 = O_{2r} \bar{O}_{2r} - \int L_2 \, dt$$

where $$L_2 = 1/\tau_2 \{(d_7)(A_{sf} - \bar{A}_{sf}) + (d_8)(A_{rf} - \bar{A}_{rf}) + (d_9)(A_{std} - \bar{A}_{std}) - (O_{2r} - \bar{O}_{2r})\} \quad (9)$$

where the $\delta_i z_i$ terms are as shown in FIG. 4b, the d and P terms are scalers from FIG. 4b, and the overlined variables (e.g. $\bar{A}_f$) are calculated values of the corresponding set point variable (e.g. feedwater valve position). The integration process of equations 8 and 9 is conducted either by means of physical apparatus or by means of numerical integration algorithm such as the fourth order RungeKutta method. This integration results from the time lags 511 and 512; in an alternative embodiment, the integration is incorporated into the state observation step 419. The vector Z, which is made up of all seven variables $\delta z_i$, represents the quantity Y − DU of equation 2.

In summary, the procedure of FIGS. 4a and 4b as thus far described feature the gathering of measured data from the machinery being controlled, that data being divided into control variables which represent the system inputs and process variables which represent the status of the system. A megawatt demand input is translated into desired set points for each of the variables, deviations are evaluated, and the process variable deviations are compensated by the control variable deviations.

The next step to be executed in the procedures defined by FIG. 4a is the state variable deviation computation. The state observer 419 functions responsively to the control variable vector U and to the compensated process variable deviations, relabeled vector Z, to compute the state variable deviations for the system in question. The state observer 419 is embodied as a multi-purpose digital computer programmed as described in the foregoing J. P. McDonald thesis or alternatively as a hard-wired analog machine which accomplished the same function. In terms of discrete digital processes, the computation of state variable deviations may be expressed as follows:

$$\frac{d\hat{x}_i}{dt} = \sum_{j=1}^{n} \Delta_{ij} \hat{x}_j + \sum_{k=1}^{p} \Omega_{ik} u_k + \sum_{r=1}^{m} \sigma_{ir} z_r \quad (10)$$

$$\hat{x} = \int \frac{d\hat{X}i}{dt} dt \quad (11)$$

where the state vector X is of dimension $n$, the respective state variable deviations being represented as $\hat{x}_i$ where $i$ varies from 1 to $n$; the control vector U is of dimension P having elements $u_k$ where $k$ varies from 1 through P; and the compensated process vector $z$ is of dimension m having elements $z_l$ and $r$ varies 1 through $m$. In equation 10, the quantities $\Delta_{ij}$, $\Omega_{ik}$, and $\sigma_{ir}$ together constitute elements of constant matrices as determined by the procedure presented in J. P. McDonald thesis and J. P. McDonald and H. G. Kwatny paper. Equation 10 therefore defines a relationship whereby the derivative of each of the state variable deviations is evaluated in terms of the state variable deviations themselves, of the control variable deviations, and of the process variable deviations. By means of the integration shown in equation 11, the state variable deviations themselves are evaluated. In accordance with the modeling used in the Kwatny et al paper and characterized in equations 1 and 2, twelve state variable deviations are evaluated for the system shown in FIG. 1. Those individual state variable deviations are identified by the following list:

$\hat{x}_1$ = superheat furnace 102 metal temperature deviation;

$\hat{x}_2$ = reheat furnace 101 metal temperature deviation;

$\hat{x}_3$ = drum 103 water volume deviation;

$\hat{x}_4$ = drum 103 steam density deviation;

$\hat{x}_5$ = primary superheater 109 steam density deviation;

$\hat{x}_6$ = secondary superheater 112 steam density deviation;

$\hat{x}_7$ = reheater 116 steam density deviation;

$\hat{x}_8$ = primary superheater 109 enthalpy deviation;

$\hat{x}_9$ = average secondary superheater 112 enthalpy deviation;

$\hat{x}_{10}$ = secondary superheater 112 outlet enthalpy deviation;

$\hat{x}_{11}$ = average reheater 116 enthalpy deviation; and $\hat{x}_{12}$ = reheater 116 outlet enthalpy deviation.

It may be clearly seen from the foregoing list that, although the process state variables effectively characterize the operation of the FIG. 1 apparatus, most are not readily measureable. Nonetheless, use of the state space approach allows for effective processing and control as though they were.

In summary, the processes defined for the state observer function 419 constitute evaluation of the various state variable deviations in response to measured and compensated values of the control variable deviations and of the process variable deviations. A more lucid and more comprehensive description of the mathematics involved and the theory behind this process is given in the above-referenced thesis of J. P. McDonald and the article of H. Kwatny and J. McDonald, both which have been incorporated by reference herein. Likewise, actual printouts of digital computer program code which embodies the process is set forth in the appendices of the thesis.

The state variable deviations $\hat{x}_1$ through $\hat{x}_{12}$ are, generally speaking, the quantities which are to be used to produce the control signals to be sent to n control actuators within the system being controlled. As set forth hereinbefore, however, these evaluated state variable deviations are only as accurate as were the modeling assumptions made in synthesizing the matrices $\Delta_{ij}$, $\Omega_{ik}$, and $\sigma_{ir}$ in equation 10. Absence of provision at this point for the compensation provided in accordance with the principles of the present invention, the computed state variable deviations would not be sufficiently accurate to be meaningful in the physical context. This compensation function is embodied by the expected output deviation calculation 420 and the differencing function 450 of FIG. 4a, in conjunction with the control translation 460.

The corrections provided in accordance with the principles of the present invention are based as follows. In the general case, equation 2 related the state variables with the control variables and process variables. Absent provision for the principles of the present invention the state variable deviations $\hat{x}_i$ would be translated directly into new control variables $u_k$ for control of the actual physical system. The correction for state variable error resulting from modeling inaccuracy is done in FIG. 4a on the basis of the CX term in equation 2, relating its computed value from the state observer 419 to its actual physical values as computed in the compensation step 421. Thus, at steps 420, the evaluated state variable deviations $\hat{x}_i$ from the state observer 419 are subjected to a process of the following term form:

$$\delta \hat{z}_r = \sum_{i=1}^{n} C_{ri} \cdot \hat{x}_i \quad r = 1, \ldots m \quad (12)$$

where the factors $C_{ri}$ are elements of the matrix C of equation 2. Thus, the output factors $\delta \hat{z}_r$ represent each of the contributions CX in the output equation 2 utilizing the state variable deviations $\hat{x}_i$ developed in the state observation step 419. It may be noted that equation 2 may also be stated as $CX = Y - DU$. Moreover, as was pointed out hereinbefore, the Z (vector) produced by the output compensation step 421 takes the form $Y - DU$. This term may be viewed, in accordance with the principles of the present invention, as an actual physical evaluation of the quantity $CX$. Consequently, the error compensation function afforded in FIG. 4a constitutes an evaluation at step 450 of the difference between the calculated quantity CX from step 420, and the actual CX value, as represented by the physical $Y - DU$ term from compensation step 421. In the form of equations the following relations obtain:

$$\delta B_i = (CX) \text{ measured} - (CX) \text{ computed} \quad (13)$$

$$= \delta z_i - \delta \hat{z}_i \quad (14)$$

where the difference between the calculated CX quantity and the actual CX quantity is defined as a set of bias variables $\delta B_i$. The bias variables $\delta B_i$, in addition to the evaluated quantities $\hat{x}_i$ for the state variables, constitute sufficient information to develop the desired control variable deviations. Accordingly, bias variable deviations $\delta B_i$ and computed state variable deviations $\hat{x}_i$ are combined in a control translation step 460 which produces control variable deviations $\delta u_{di}$, may be expressed in the form of the following equation:

$$\delta u_{di} = \sum_{j=1}^{n} K'_{ij} \hat{x}_j + \sum_{k=1}^{m} K''_{ik} (\delta B_k) \quad (15)$$

Where $K'_{ij}$ and $K''_{ik}$ represent coefficients, like those dealt with hereinbefore, are computed in accordance with the procedure specified in the thesis by J. P. McDonald and the article by J. P. McDonald and H. G. Kwatny.

Once the desired control variable deviations have been evaluated, it only remains to combine them with the control variable set points, synthesized at the very beginning of the process of FIG. 4a. This combination step, which is shown at block 422 of FIG. 4a, involves the combination of fed forward control variable set points with corresponding control variable deviations. The quantities produced by the combination step 422 therefore represent actual control variable values which, when coupled to the apparatus being controlled, result in production of the desired megawatt demand. That is, coupled back from combination circuit 422 to the apparatus being controlled are actual desired position signals for the feedwater valve, the governing valve, the superheat furnace return oil valve, the reheat furnace return oil valve, the superheat and reheat furnace input air louvers, the superheat furnace burner tilt, and the reheat furnace burner tilt. The result of application of these quantities is the corresponding desired megawatt demand.

In summary, the embodiment of FIG. 4a illustrates the operation of the principles of the present invention as applied to state variable control of electrical power generating stations. Physical quantities are measured from the system being controlled, and utilizing a predetermined mathematical structure, estimated state variable deviations are evaluated, but without more, they involve modeling error. In accordancce with the principles of the present invention, the modeling error which obtains is predicted and a computation is made on the basis of corresponding measured quantities. The estimated state variables themselves and the estimated modeling error terms are utilized together for computation of control variable deviations combined with set point values which were fed forward. The combined terms in turn represent actual desired positions of controlling apparatus in the system being controlled. When the control aspects are changed accordingly, the specified output requirements result.

It should therefore be emphasized the principles of the present invention relate particularly to the correction for modeling error in the context of control of large scale multivariable physical systems. Thus, the utility of the present invention is not limited strictly to control of electric power generating stations. Rather, the principles of the present invention may be advantageously applied to virtually any system which is amenable to state variable representation.

Finally, it should be noted that the synthesis of each of the constants utilized in the translations to and from the state space can be applied to a wide class of physical systems. The article and thesis, incorporated by reference herein, comphrehensively deal with the problem of evaluating those constants for a particular system. Other approaches to evaluation thereof, however, are by no means limiting with respect to the principles of the present invention.

What is claimed is:

1. In a system having a first plurality of physical parameters designated y, measurable by sensing means, and a second plurality of input control parameters designated u, alterable in said system by control means, said system being identified with a predetermined mathematical model of the form $dx/dt = Ax + Bu$, $y = Cx + Du$ for translating said control parameters into a third plurality of state variables designated $x$ which dynamically characterize the behavior of said system, and for translating said state variables and control parameters into the measurable physical parameters, said model being exercised in and by sequentially operating computer means, a method for controlling said system to meet specified output requirements comprising the steps of:
  a. measuring, at said sensing means, the present values of said physical parameters;
  b. developing a set of estimates of said state variables;
  c. translating said estimates of said state variables into corresponding estimates of said physical parameters; and
  d. controlling said system to meet said requirements, said controlling step including operating said computer means to perform the steps of
    1. predicting error of said set of values of said estimates of said physical parameters resulting from inaccuracy in said mathematical model;
    2. developing, in response to said set of values of said estimates of said state variables, to predicted error from said predicting step, and to said present values of said physical parameters, a set of values for said input control parameters, and
    3. coupling said set of values for said input control parameters to said control means in said system.

2. A method as described in claim 1 wherein said developing step includes the steps of:
  a. identifying set point values of said physical parameters and of said control parameters;
  b. evaluating deviations between present values and corresponding set point values of said physical parameters and of said control parameters;
  c. adjusting deviations in said physical parameters in response to deviations in said control parameters; and
  d. computing, in response to said evaluating and adjusting steps, a plurality of estimates of state variable deviations for said system.

3. A method as described in claim 2 wherein said adjusting step includes producing a vector Z of the Form $Y - DU$, and said computing step includes producing an estimate $\hat{X}$ of the vector X in accordance with a model of the form $dX/dt = AX + BU$, $Y = CX + DU$, where X is a vector of said state variable deviations, U is a vector of deviations in said control parameters, Y is a vector of deviations in said physical parameters, and A, B, C, and D are matrices which comprise said mathematical model of said system.

4. A method as described in claim 3 wherein said translating step includes the step of computing a vector $C\hat{X}$, and said predicting step includes the step of evaluating the difference between said vector $C\hat{X}$ and said vector Z from said producing step.

5. A method as described in claim 1 wherein said last named developing step includes the steps of:
  a. developing set point values for said control parameters;
  b. producing linear combinations of said set values of a said estimate of said state variables and of predicted error of said set of estimates of said physical parameters, said linear combinations being expressed in terms of said control parameters; and
  c. combining said set point values of said control parameters with corresponding linear combinations from said producing step.

6. An integrated electrical power generation and control system comprising;
  a. turbine means having a first plurality of physical characteristics and a second plurality of input factors;
  b. boiler means for producing steam for said turbine means, said boiler means having a third plurality of physical characteristics and a fourth plurality of input factors; and
  c. sensing means, in said turbine means and said boiler means, for detecting present values of said first and third pluralities of characteristics;
  d. means including sequentially operating computer means for controlling said turbine means and said boiler means, CHARACTERIZED IN THAT said computer means is programmed to perform the steps of
    1. measuring present values, from said sensing means, of said first and third pluralities of characteristics, said measured values being designated y,
    2. developing, in accordance with a mathematical model of said boiler means and said turbine means, of the form $dx/dt = Ax + Bu$, $y = Cx + Du$, estimated changes in a plurality of state variables designated $x$ which approximate specified requirements of said systems,
    3. translating said estimated changes into corresponding estimated changes in the said first and third pluralities of characteristics;
    4. predicting error in said estimated changes in said first and third pluralities resulting from inaccuracy in said mathematical model,
    5. synthesizing, in response to said measuring, developing, and predicting steps, a set of control values for said second and fourth pluralities of input factors designated u; and
  e. means for actuating operational changes in said turbine means and boiler means in accordance with control values produced by said computer means in said synthesizing step.

7. A system as described in claim 6 wherein said step of developing includes the steps of:
  a. identifying set point values for said first and third pluralities of characteristics and for said second and fourth pluralities of characteristics;
  b. evaluating deviations between present values and corresponding set point values of said pluralities of characteristics and factors;
  c. adjusting deviations in said second and fourth pluralities of characteristics in response to deviations in said first and third pluralities of characteristics in proportion to said second and fourth pluralities of factors, and
  d. computing, in response to said adjusting and evaluating steps, a plurality of state variable deviations for said turbine means and said boiler means.

8. A system as described in claim 7 wherein said step of adjusting includes producing a vector Z of the form $Y - DU$, and said computer step of computing produces an estimate $\hat{X}$ of the vector X in accordance with model of the form $dX/dt = AX + BU$, $Y = CX + DU$ where $X$ is a vector of state variable deviations, $U$ is a vector of deviations in said second and fourth pluralities of factors, $Y$ is a vector of deviations in said first and third pluralities and $A$, $B$, $C$, and $D$ are matrices which comprise said mathematical model.

9. A system as described in claim 8 wherein said process of predicting includes computing the vector $C\hat{X}$, and said predicting step includes evaluating the difference between said vector $C\hat{X}$ of said computing step and the vector Z of said adjusting step.

10. A system as described in claim 6 wherein said boiler means includes first, second, and third steam superheating means and said turbine means includes first and second turbines and a turbine governing stage including valves regulating the flow of steam to said first and second turbines, said first plurality of characteristics including output power generation of said turbine means, steam temperature and pressure at said turbine governing stage, said second plurality of characteristics including steam temperature and pressure at said first, second, and third superheating means, and flow of steam at said turbine governing stage.

11. A system as described in claim 10 wherein said boiler means further includes first and second water spray means positioned respectively at inputs of said second and third superheating means, said second plurality of factors including spray flow from said first and second water spray means and said first plurality of factors including the position of valves in said turbine governing stage.

12. A system as described in claim 6 wherein said boiler means includes:
   a. at least one furnace having associated air and fuel inlet valves;
   b. a boiler drum for storage of water and production of steam; and
   c. a water cycling system fed by a valve, said third plurality of characteristics including fuel and air intake of said furnace and water flow into said boiler, and water level and steam pressure in said drum.

13. A system as described in claim 12 wherein said furnaces each include:
   a. burner means having a tilt adjustment for regulating the amount of heat coupled from said furnaces to said water cycling system, said fourth plurality of factors including the position of said air inlet valve to said furnaces, the position of said valve to said water cycling system, and the tilt adjustment of said furnaces.

14. In an electrical generating station having a first plurality of measurable physical parameters, designated y and measurable by sensing means, said physical parameters being governed by a second plurality of input control parameters designated u and alterable in said system by control means, a method of controlling said system to meet a specified output demand comprising the steps of:
   a. sensing present values of said physical parameters and said control parameters utilizing said sensing means;
   b. providing a programmed sequentially operating computer means to perform the steps of
      i. translating said specified demand into a set of reference values for said physical parameters and for said input control parameters,
      ii. developing differentials between present values of said physical parameters and said input control parameters, and corresponding reference values from said translating step,
      iii. adjusting physical parameter differentials to compensate for the amplitude of input control parameter differentials,
      iv. developing from the input control parameter differentials and from the adjusted physical parameter differentials, in accordance with a predetermined mathematical model, $dx/dt = Ax + Bu$, $y = Cx + Du$, corresponding differentials of a plurality of state variables designated x which characterize said system,
      v. translating said differentials of a plurality of state variables into associated differentials in said physical parameters,
      vi. estimating error in differentials of said physical parameters introduced in said last named translating step due to inaccuracy of said mathematical model;
      vii. correcting said adjusted physical parameter differentials to account for said modelling error,
      viii. establishing new values of said input control parameters in response to said reference values thereof, to said differentials of said plurality of state variables, and to corrected adjusted physical parameter differentials,
      ix. coupling said new values to said control means; and
   c. applying said new values of said input parameters to said system to realize corresponding change in said physical parameters.

15. A method as described in claim 14 wherein said adjusting step includes producing a vector Z of the form $Y - DU$, and said developing step includes producing an estimate $\hat{X}$ of a vector X in accordance with a model of the form $dX/dt = AX + BU$, $Y = CX + DU$, where X is a vector of said state variable differentials, U is a vector of differentials in said input parameters, Y is a vector of differentials in said physical parameters, and $A$, $B$, $C$, and $D$ are matrices which comprise said mathematical model of said system.

16. A method as described in claim 15 wherein said estimating step includes the step of computing vector $C\hat{X}$ and said predicting step includes the step of evaluating the difference between said vector $C\hat{X}$ and said vector Z from said producing step.

17. A method as described in claim 14 wherein said establishing step includes the steps of:
   a. developing set point values for said input control variables;
   b. producing linear combinations of said differentials of said plurality of state variables and of corrected physical parameter differentials, said linear combinations being expressed in terms of said physical parameters; and
   c. combining set point values of said input control parameters with corresponding linear combinations from said producing step.

* * * * *

UNITED STATES PATENT OFFICE
CERTIFICATE OF CORRECTION

Patent No. 4,027,145  Dated May 31, 1977

Inventor(s) John Patrick McDonald and Harry G. Kwatny

It is certified that error appears in the above-identified patent and that said Letters Patent are hereby corrected as shown below:

Column 1, line 28, "furances" should be --"furnaces--;
Column 1, line 63, "of turbine" should be --of the turbine--;

Column 3, line 28, "systhesized" should be --synthesized--;
Column 3, line 67, "Opitmal" should be --Optimal--;
Column 4, line 2, "1975" should be --1973--;
Column 7, line 24, "p" should be --P--;
Column 9, line 29, "Control Variable" should be --"Control Variable"--;
Column 11, line 21, "$0_2s - \overline{0}_{2s}$" should be --$0_{2s} - \overline{0}_{2s}$--;
Column 11, line 26, "$0_{2r} \overline{0}_{2r}$" should be --$0_{2r} - \overline{0}_{2r}$--;
Column 11, line 33, "$\delta i Z_i$" should be --$\delta Z_i$--;
Column 12, line 3, " $\sigma i r$" should be --$\sigma_{ir}$--;
Column 13, line 31, "$\hat{x}_i r = 1,$" should be --$\hat{x}_i \quad r = 1$--;

Signed and Sealed this

First Day of November 1977

[SEAL]

Attest:

RUTH C. MASON  
Attesting Officer

LUTRELLE F. PARKER  
Acting Commissioner of Patents and Trademarks